F. S. KOCHENDORFER.
IMPREGNATING MACHINE.
APPLICATION FILED JAN. 4, 1918.

1,365,414.

Patented Jan. 11, 1921.
6 SHEETS—SHEET 1.

Inventor
Frederic S. Kochendorfer
by J. E. Roberts Atty.

UNITED STATES PATENT OFFICE.

FREDERIC S. KOCHENDORFER, OF CHICAGO, ILLINOIS, ASSIGNOR TO WESTERN ELECTRIC COMPANY, INCORPORATED, OF NEW YORK, N. Y., A CORPORATION OF NEW YORK.

IMPREGNATING-MACHINE.

1,365,414.    Specification of Letters Patent.    Patented Jan. 11, 1921.

Application filed January 4, 1918. Serial No. 210,304.

*To all whom it may concern:*

Be it known that I, FREDERIC S. KOCHENDORFER, a citizen of the United States, residing at Chicago, in the county of Cook and State of Illinois, have invented certain new and useful Improvements in Impregnating-Machines, of which the following is a full, clear, concise, and exact description.

This invention relates to an impregnating machine, and more particularly to a machine of this character in which the impregnating compound is maintained in a physical state suitable for the impregnating operation by an electrically operated heating means.

The required and specified insulation properties of materials used in electrical apparatus are very frequently obtained by impregnating these materials with a suitable insulating or water-prooofing compound. A compound which is suitable for such purposes is known under the trade name of "Sarco." Compounds used for this purpose are generally solid at ordinary room temperatures and must, therefore, be heated to transform them to the fluid state suitable for the impregnating operation.

It is one of the objects of this invention to improve the efficiency of this heating operation by electrically heating the compound, the electrical resistor used for this purpose being positioned in the impregnating compound container in direct contact with said compound.

Other objects of the invention consist in producing an improved machine very compactly and efficiently constructed which reduces the floor space required per machine unit and which decreases the compound losses inherent in the impregnating operation due to oxidation, and in producing an improved machine controlling and operating means to increase generally the efficiency with which the impregnating operation can be performed.

The invention is illustrated in the accompanying drawings, in which.

The preferred form of the invention as herein illustrated and described is adapted to a machine for impregnating textile insulated electrical conductors, but obviously the invention is not limited to this specific embodiment, but is capable of other applications, as set forth in the appended claims.

As illustrated in Figs. 1, 2, 3 and 6, the machine consists of a table 10 supported on a screw 11 which rides in a sleeve or nut 12 supported on a thrust bearing 13 and revolving in a bearing 14 mounted on the main frame 15 of the machine. Secured to either end of the table 10 are the brackets 16 which terminate in the sleeves 17 that are slidably mounted on the columns 18 secured to the rear end of the main frame 15 of the machine. The compound containing receptacle proper 20 is constructed of any suitable material such as sheet steel and is mounted on the table 10 by means of brackets such as 21 and 22. The compound containing receptacle 20 is completely inclosed by a suitable thickness of heat insulating material 23, such as "Sil-O-Cil," which is in turn inclosed and protected by the sheet steel covering 24. Extending downwardly from the bottom of the container proper 20 is a drain pipe 25 which is utilized for cleaning the tank and which is fitted with a valve supplied with an operating key 26 which extends into a tube 27 inserted into the heat insulating compound 23 and through which access to the key 26 is obtained for operating the valve and draining the tank.

Figure 3:
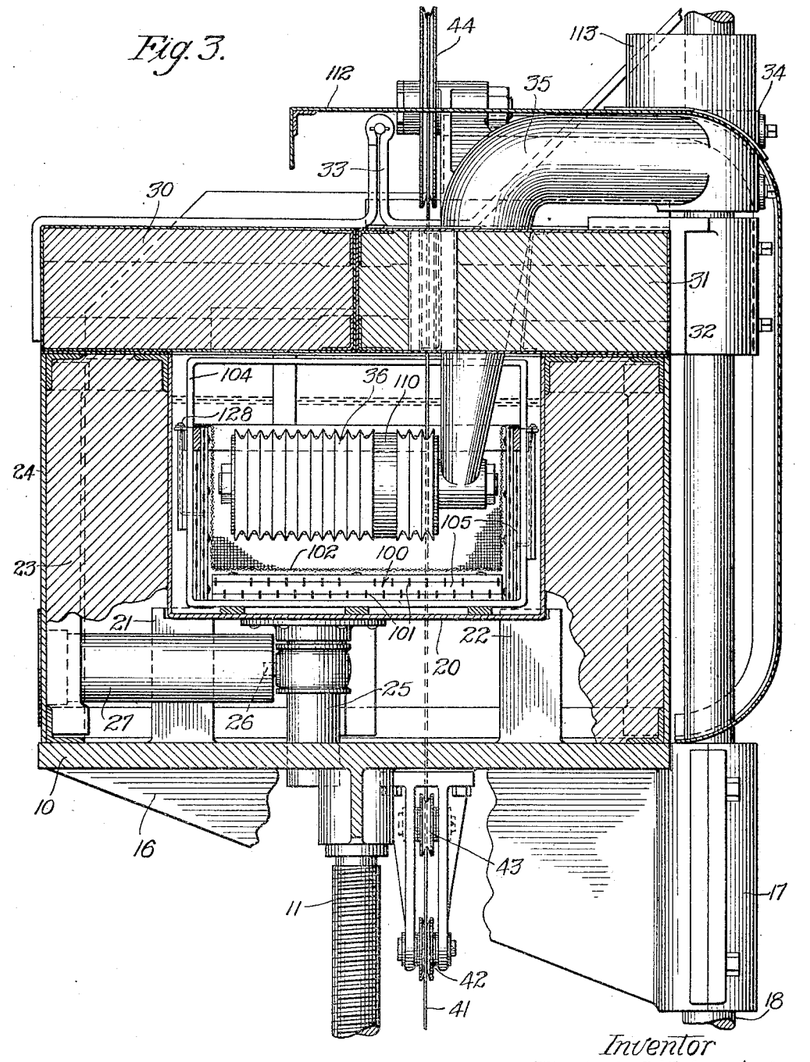
Fig. 3, a vertical section through the machine on the plane 3—3 of Fig. 1.

Supported above and completely covering the container 20 and its heat insulating walls is the top or cover of the tank which is composed of two parts 30 and 31. The part 31 is rigidly secured to the columns 18 by sleeves such as 32, to which the part 31 is rigidly secured. The part 30 constitutes a hinged cover for the tank 20 and is secured to the part 32 by means of the hinges 33. The part 30 of the cover of the tank may therefore be raised through the agency of said hinges, thereby giving free access to the tank proper 20 for inspection purposes when said tank has been raised to the position directly under said cover, as illustrated in Fig. 3. Rigidly secured to each of the columns 18 by means of a sleeve such as 34 are brackets such as 35 integral with said sleeve. Each of these brackets carries a plurality of grooved pulleys 36 which serve to guide the wire through the tank 20 in the impregnating operation. This is clearly illustrated in Figs. 3 and 4.

As hereinbefore stated, the sleeves 32 and 34 are rigidly secured to the columns 18, whereas the table 10 carrying the container 20 is slidably mounted on said columns by means of the sleeves 17. The table 10 carrying the container 20 and its associated mechanism is capable of being raised and lowered by means of the screw 11, in which operation the sleeves 17 slide up and down on the columns 18, as hereinafter to be described. Since the sleeves 32 and 34 and their associated apparatus are rigidly secured to the columns 18, the brackets 35 and their associated grooved pulleys 36 as well as the cover of the container comprising the parts 30 and 31 will remain stationary when the table 10 and its associated apparatus is lowered or raised.

Mounted on the left end of the frame 15 are the brackets 37 and 38 which carry a supply spool 40 that feeds the wire 41 to be impregnated to the machine. The wire 41 is guided into the tank 20 by means of the sheaves 42 and 43 mounted underneath the table 10 and the grooved pulley 44 mounted on a suitable bracket attached to the main frame of the machine above the section 31 of the cover of the container. The wire 41 after leaving the pulley 44 is guided over a plurality of grooved pulleys 36 attached to the brackets 35 at either end of the tank and is then passed through a second opening in the cover 31 through a scraping and wiping mechanism, hereinafter to be described, over one of a plurality of grooved pulleys 45 mounted on a bracket 46 secured to the main framework of the machine and thence to another one of a plurality of grooved pulleys 47 mounted on a bracket 48 at the other end of the main frame of the machine. The wire is next passed to and fro between the series of grooved pulleys mounted on these two brackets. During the period that the wire is traveling over the plurality of grooved pulleys mounted on the brackets 46 and 48 it is being cooled, and after leaving the last grooved pulley mounted on the bracket 48 it is guided under the sheave 50, thence around the capstan or grooved pulley 51 and through the distributing mechanism 52 to a take-up spool 53.

Figure 6:
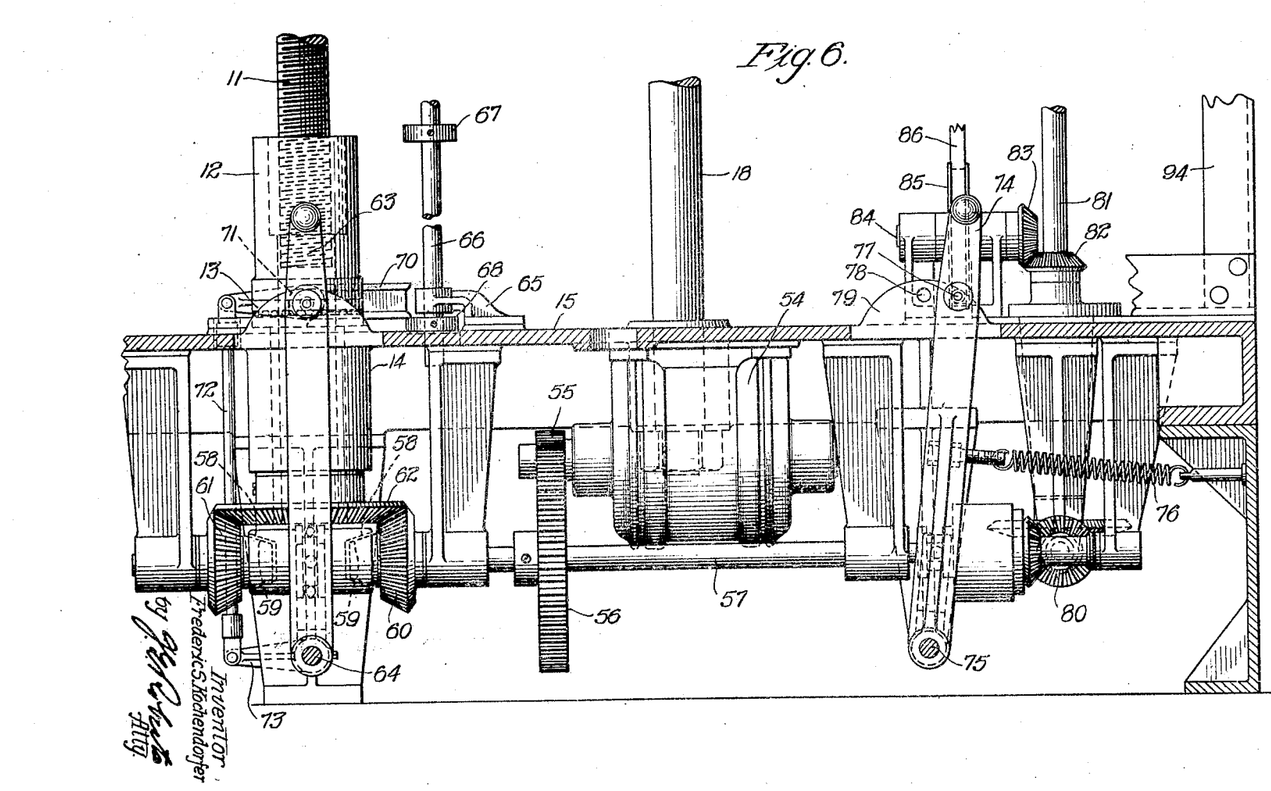
Fig. 6 is a front elevation on the plane 6—6 of Fig. 2 and illustrates the mechanism used for raising and lowering the tank.

The mechanism which controls the moving elements of the machine is illustrated in Fig. 6. Any suitable driving means may be utilized for this purpose, but in the preferred embodiment of the invention herein illustrated an electrical motor 54 is utilized. This motor through the spur gears 55 and 56 drives a shaft 57 suitably journaled in bearings suspended from the framework of the machine. Secured to the left end of this shaft is the driving member 58 which coöperates with the driven cones 59 of a friction clutch mechanism. One of these cones 59 is integral with the bevel gear 60, and the other cone 59 is integral with the bevel gear 61, the bevel gears 60 and 61 being loosely mounted on the shaft 57 and meshing with a bevel gear 62 secured to the nut 12. A lever 63 pivotally mounted on a stud 64 secured to the frame of the machine is secured to the movable driving member 58 of the clutch. When this lever is displaced toward the right, it will push the right end of the driving member 58 into engagement with the cone 59 secured to the bevel gear 60. Likewise when this lever is displaced to the left, the left end of the driving member 58 will be moved into engagement with the cone 59 secured to the bevel gear 61. When the lever 63 is in its neutral position, as shown in Fig. 6, the driving member 58 will be out of engagement with its associated driven cones 59. When the lever 63 is displaced to the right the rotary movement of the shaft 57 is transmitted to the bevel gear 60 through the gear 62 and thence to the nut 12 which will consequently rotate about the screw 11 and thereby raise the table 10 and its associated apparatus. Similarly when the lever 63 is displaced to the left, the power will be transmitted by the shaft 57 in a similar way to the nut 12 which in this case, however, will rotate in a direction opposite to that when power was transmitted from the shaft 57 to the gear 60, and consequently in this instance the nut 12 rotating about the screw 11 will serve to lower the table 10 and its associated mechanism.

Secured to the frame 15 of the machine is a bracket 65 which guides a rod 66 secured to the table 10 and on which are mounted the displacing plates 67 and 68. A lever 70 pivoted at 71 is positioned so that the extreme right end thereof will protrude into the path of travel of the plates 67 and 68. Pivotally secured to the left end of this lever 70 is a link 72 which is pivotally secured to a second link 73 integral with a protruding journal of the lever 63 which rides on the stud 64. The displacement plates 67 and 68 are so positioned on the rod 66 that the plate 67 will strike the lever 70 when the table 10 and the associated apparatus has been moved downwardly to its lowest position; and the plate 68 will strike the lever 70 when said table and its associated apparatus is raised to its highest position, in which position the covered plates 30 and 31 will be in contact with the top part of the tank, as illustrated in Fig. 3. When the plate 68 in its upward movement strikes the lever 70, this lever will rotate about its pivot 71 and this movement will be transmitted through the links 72 and 73 to the lever 63, which thereupon will be shifted to its neutral position and retract the power member 58 of the clutch from the cone 59 secured to the bevel gear 60. Similarly, when the displacement plate 67 strikes the lever 70, the lever 63, through the agency of the links 72 and 73, will be moved in the opposite direction, to its neutral position, and will withdraw the power member 58 of the clutch from the cone 59 secured to the bevel gear 61. The lever 70 and the rod 66 with its associated displacement plates 67 and 68 consequently constitute automatic means for stopping the raising and lowering operation of the table 10 and the associated containing receptacle 20 when this raising and lowering operation has reached the maximum desired.

Secured to the other end of the shaft 57 is a friction clutch mechanism which is operated and controlled by the lever 74 pivotally mounted on a stud 75 secured to the frame of the machine. This lever is held in a non-operating position by the spiral spring 76 and is maintained in an operating position by a spring pressed pin 77 which engages a perforation 78 fitted in a protruding ear 79 secured to the frame of the machine. When the lever 74 is moved into its operating position, power from the shaft 57 is transmitted by means of suitable gearing shown at 80 to a vertical shaft 81. This shaft 81 carries the bevel gear 82 which meshes with a bevel gear 83 secured to a shaft 84 which carries the pulley 85. The belt 86 rides on the pulley 85 and is carried to a pulley 87 which is secured to a shaft 88 which carries the take-up reel 53. The shaft 88 carries a second pulley 89 engaging the belt 90 which in turn engages another pulley 91 that controls the drive of the distributing mechanism 52. A belt tensioning adjusting device 93 of any suitable character is mounted on the upright 94 of the frame-work of the machine and serves to regulate the tension of the belt 86. The belt 86 provides a frictional drive for the shaft 88 carrying the take-up spool 53, and consequently as the coil of wire piles up on this spool, the angular speed of the spool will be reduced by slippage between the belt 86 and its associated pulleys, the linear speed at which the wire is fed to the take-up spool 53 being substantially constant.

The speed at which the wire 41 is drawn through the impregnating compound containing receptacle is regulated by the capstan 51 which is driven from the shaft 81 through the bevel gears 95 and 96, the gear 96 being rigidly secured to a shaft 97 on which the capstan 51 is mounted. The capstan 51 which is directly driven from the shaft 81 consequently controls the speed at which the wire is drawn through the impregnating compound containing receptacle, and since this wire is drawn through said receptacle at a constant speed, the wire is delivered to the take-up reel 53 at said constant speed and said take-up reel gradually reduces in angular speed as the coil of wire builds up on the reel, because of slippage, and thus stretching of the wire between the capstan 51 and the take-up reel 53 is practically obviated.

Figure 4:
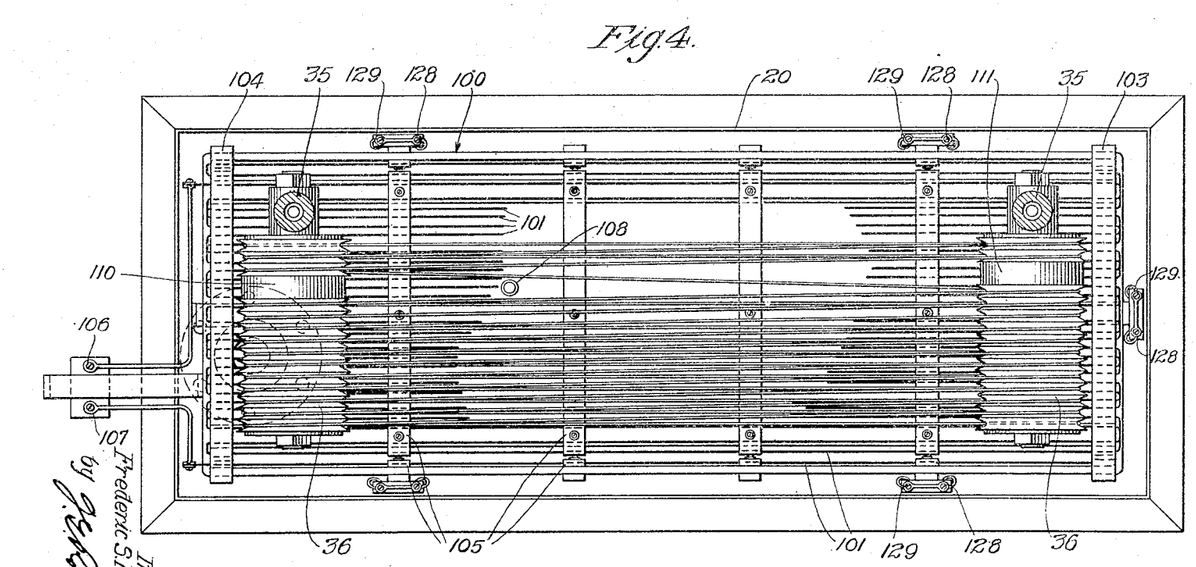
Fig. 4 shows a plan view of the impregnating tank proper indicating the method of mounting the electrical resistor and the wire guiding means within the tank.
Figure 5:
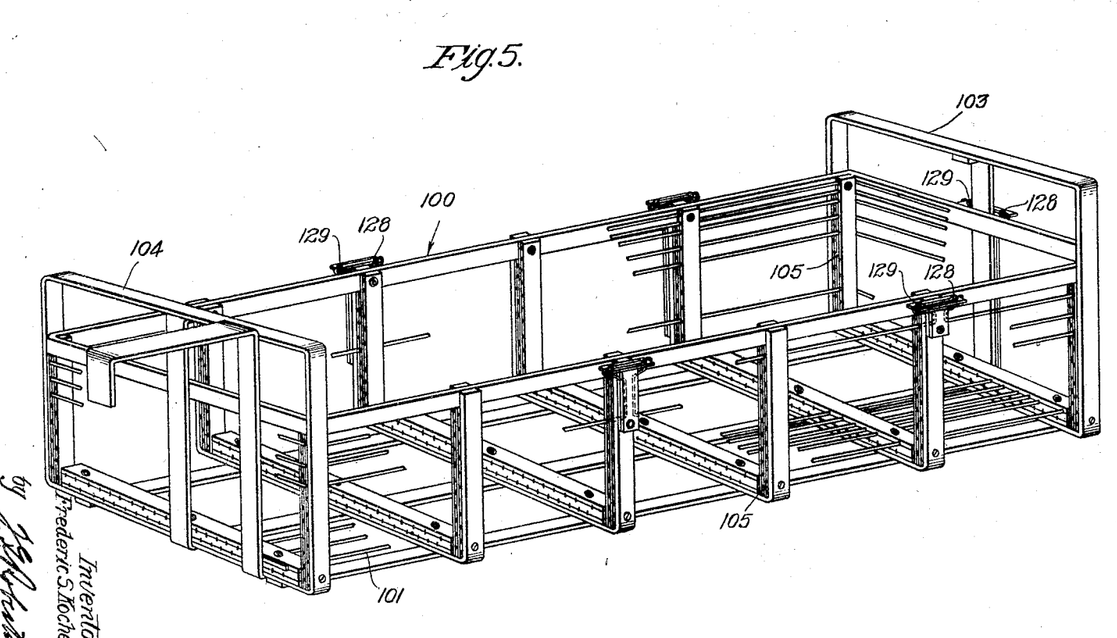
Fig. 5 is an isometric view of the frame or basket used for mounting the electrical resistor.

Removably placed within the compound containing receptacle is the frame or basket 100 carrying the heat producing electrical resistor 101 and also a screen basket 102. The basket or frame carrying the electrical resistor 101 is fitted into the compound containing receptacle 20 so that the resistor element 101 is evenly distributed over the four sides and the bottom of this receptacle, as illustrated in Figs. 3, 4, and 5. The screen basket 102 is placed in the compound containing receptacle over, and so that it entirely covers and protects, the frame-work containing the electrical resistor 101. This screen serves as a protecting means for the resistor, parts of which might be injured by lumps of the impregnating compound which are thrown into the container when said compound is still in its solid state. It also serves as a protection against any foreign substances which might fall into the container. If this screen were not provided, chunks of this compound when thus deposited in the receptacle might cause bends or kinks in the resistor 101 which might result in short circuits. The resistor carrying basket, as clearly illustrated in Fig. 5, comprises a light iron framework fitted with the handles 103 and 104, by means of which it can be conveniently lowered into the receptacle 20. This framework carries a plurality of insulating strips such as 105 between which the resistor is mounted and which serve as holding means for the resistor as it is carried completely around the sides of the basket and over the bottom thereof for two complete layers. In the preferred form of the invention all of the wire surrounding the sides and bottom of this framework is connected in series and carried to the connecting terminals 106 and 107 which serve as terminals for the resistor and which are connected to any suitable source of electrical energy.

When the resistor is thus wired in series, taps are taken therefrom at specified intervals and wired to auxiliary connecting terminals such as 128 and 129. These auxiliary connecting terminals are used whenever trouble is experienced with some section of the resistor due, for example, to an open or short circuit inadvertently introduced into the circuit. If such trouble is encountered with the tank filled with impregnating compound in its solid state, the compound could naturally not be heated by means of the resistor and considerable trouble would be experienced in removing the compound from the container. In such cases the auxiliary terminals are utilized in such a manner that the damaged or injured portion of the resistor is cut out of the circuit and the compound in the container heated with that portion of the resistor which is free from trouble.

As indicated on the drawing, each pair of auxiliary terminals is interconnected, and this connection between these terminals is opened at such points as are necessary to cut out of the circuit the injured portion of the resistor and this portion of the circuit is short circuited by a conductor which is wired from one of these pairs of auxiliary binding posts to a second one of these auxiliary binding posts between which, in the normal operation of the resistor, the injured section thereof is contained.

Instead of wiring the resistor in series—that is, for a single phase operation, the resistor elements may be wired to a three-phase alternating circuit, under which circumstances any two of the phases can be readily utilized for the purpose just explained whenever trouble is encountered in the third phase.

The covered top 31 is fitted with an opening through which projects a thermometer 108 which extends into the impregnating compound and the calibrations of which extend over the covered top 31 so that the operator can conveniently determine the temperature of the compound in the receptacle or tank 20. To provide a space for the thermometer 108 the blank space 110 and 111 is provided on the brackets containing the grooved pulleys 36. Mounted above the cover plates 30 and 31 is the sheet iron apron 112 which serves to confine the fumes rising from the tank 20 during the impregnating operation, which escape through the openings in the cover plate which admit the wire into the tank 20, and direct them to a suitable vent pipe 113.

Figure 1:
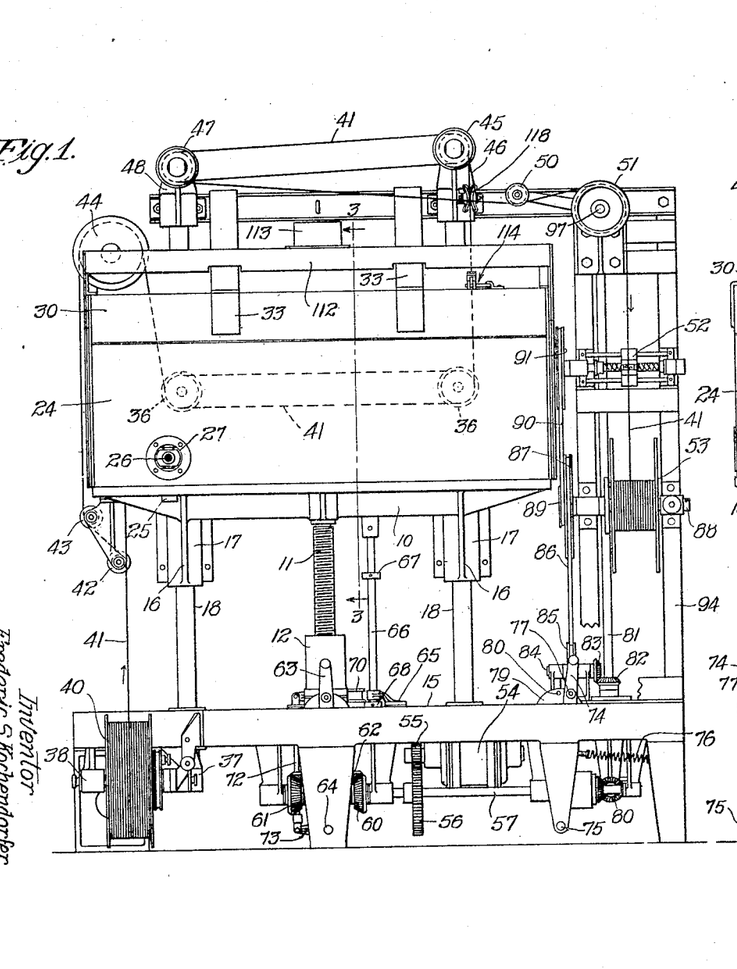
Figure 1 illustrates a front elevation of the complete machine.
Figure 2:
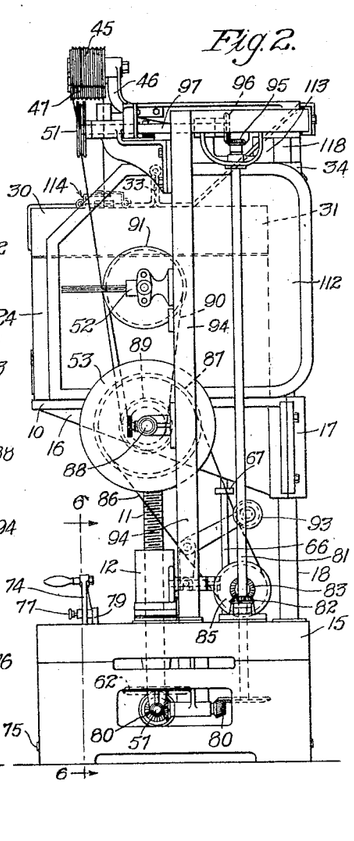
Fig. 2, a side elevation thereof.
Figures 10, 11:
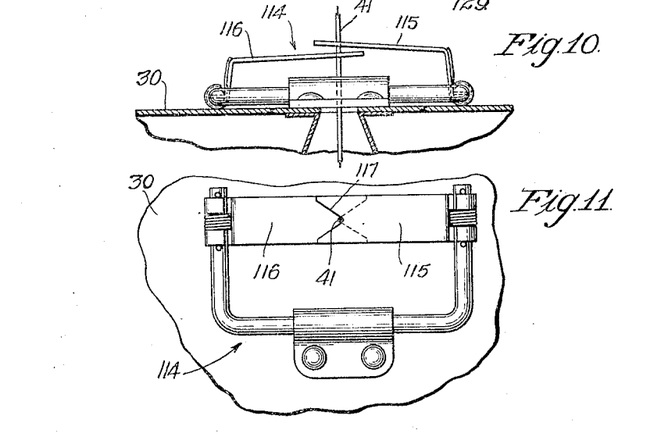
Fig. 10 is a side view of the scraping mechanism.
Fig. 11 shows a plan view thereof.

Figs. 10 and 11 indicate in detail the construction of the scraper mounted on top of the cover and indicated at 114 in Figs. 1 and 2. This scraper consists of the two spring pressed plates 115 and 116. These plates have their extremities 117 cut in the form of a V, the apex of which rides on the surface of the wire as it leaves the impregnating tank. As these spring pressed plates are mounted on opposite sides of the wire, the V-shaped extremities thereof serve to scrape off lumps of impregnating compound which adhere to the wire.

Figure 7:
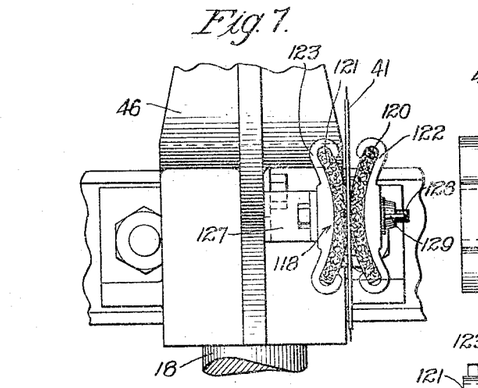
Fig. 7 shows a side view of the wiper mechanism.
Figure 8:
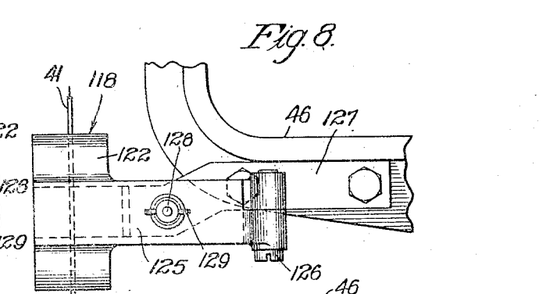
Fig. 8 is an end view thereof.
Figure 9:
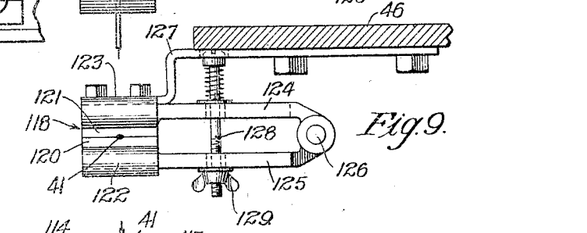
Fig. 9 is a plan view thereof.

Figs. 7, 8, and 9 illustrate the wiping mechanism mounted directly above the scraper and indicated in Fig. 1 at 118. This wiping mechanism consists of a pair of felt pads 120 and 121, between which the wire is drawn. These felt pads are mounted in the holders 122 and 123 which are secured to the ends of the plates 124 and 125, said plates being pivotally mounted in the screw 126. The holders together with the associated plates 124 and 125 are secured to the bracket 46 by means of a bracket 127. A screw 128 fitted with a thumb nut 129 is provided to regulate the tension of the pads 120 and 121 on the wire 41 as it is drawn through said pads. This wiper serves to further remove the excess of impregnating compound which may adhere to the wire after it has left the scraper.

The operation of the machine is briefly as follows:

The table 10 and its associated apparatus including the container 20 are first moved to their lowermost position by displacing the lever 63 to the left and thereby rotating the sleeve 12 about the screw 11. When the container has been moved to this position, it is readily accessible for positioning therein the frame 100 carrying the electrical resistor 101. After the resistor has been placed in position, the protecting basket 102 is positioned in the container above said resistor. The brackets 35 which carry the grooved pulleys 36 on which the wire to be impregnated is strung are not lowered with the table 10, since they are rigidly secured to the columns 18, and consequently when the table and container are lowered, these pulleys 36 are exposed and readily accessible for the initial stringing of the wire prior to the impregnating operation.

In the stringing of the wire a supply spool 40 is first mounted between the brackets 37 and 38, and the wire 41 is then carried over the sheaves 42 and 43 and to the grooved pulley 48. From said pulley the wire is strung back and forth between the grooves of the pulleys 36, after which it is fed through the scraping mechanism 114 and the wiping mechanism 118. From the wiping mechanism 118 the wire is strung back and forth between the grooves of the pulleys 45 and 47, from whence it is fed around the sheaves 50 to the capstan 51.

The wire is given several turns about the capstan 51 and is then carried through the distributing mechanism 52 to the take-up reel 53.

When the wire has been thus strung over the various pulleys and sheaves of the machine the container 20 is filled with the desired amount of impregnating compound, after which current is passed through the resistor 101 to convert said compound from its solid to its fluid state. When the compound has been converted to its fluid state, the lever 63 is displaced to the right, the motor 54 having been previously started, and this will rotate the sleeve 12 in a direction to raise the table 10 and the container and its associated apparatus to its uppermost position. When the container reaches this uppermost position—that is, the position in which the cover plates 30 and 31 will be in contact with the top part of the container, the upward movement of the table and container will be automatically stopped by the displacement plate 68 and its associated apparatus, as hereinbefore described.

The wire has now been strung through the apparatus; the impregnating compound in the container has been converted to the fluid state and is being maintained in this condition by the heat generated because of the current flowing through the resistor 101, and the apparatus is therefore now in condition to start the movement of the wire through the impregnating tank. This is accomplished by shifting the lever 74 to the left which, through suitable gearing and belting, will start the rotation of the capstan 51, the movement of the distributing apparatus 52, and the rotation of the take-up reel 53. The rotation of the capstan 51 will draw the wire from the supply spool 40 over the various pulleys and sheaves and through the tank and feed it to the distributer 52, which will feed it in smooth even layers to the take-up reel 53. As the wire passes back and forth between the grooves of the pulleys 36 it is thoroughly impregnated and after leaving the last groove of the pulley 36 stationed at the right side of the machine it will pass through the scraping mechanism 114 and the wiping mechanism 118 which will remove any excess compound which may have collected on the wire.

The wire 41 after leaving the wiping mechanism is cooled and the impregnating compound hardened as it passes back and forth between the grooved pulleys or rollers 45 and 47. The impregnating compound served to the wire is consequently in a hard solid state when it reaches the capstan 51, from which it is fed to the take-up reel 53, to the distributer 52.

All gases or fumes which are generated, due to the heating of the impregnating compound, will escape through the openings in the cover plate 31, through which the wire enters and leaves the container, and from there will be directed by the apron 112 extended over the top of the machine to the vent pipe 113. Inasmuch as the only openings through which fumes can escape are the holes in the cover plate 31, very little of the impregnating compound is lost, due to oxidation, since the fumes are retained in the impregnating chamber 20 and are not permitted to dissipate in the room atmosphere. This confining of the fumes is an important feature, inasmuch as, in addition to the saving of impregnating compound which is a material item, it also prevents contamination of the atmosphere, which is very beneficial for the health of the operators.

If for any reason it is desired to inspect the contents of the container 20 without lowering the table 10, this may be readily accomplished by raising the hinged portion of the cover which exposes to view one-half of the upper surface of the container. If a thorough inspection is desired, the table and container are lowered, as hereinbefore described.

This impregnating apparatus comprises a very efficient mechanism because of its compact nature thereby utilizing a minimum amount of floor space, and further because of the high efficiency of the impregnating compound heating means in which the heating element is in direct contact with the compound and the container containing the heating element and compound is completely surrounded by a heavy wall of heat insulation. Practically all of the heat generated by the resistor is consequently beneficially utilized and heat losses are reduced to an absolute minimum.

Obviously the invention is not limited to the specific embodiment thereof herein illustrated and described, but is capable of many variations and other applications within its spirit and scope, as set forth in the appended claims.

What is claimed is:

1. In an impregnating machine, in combination, an impregnating compound containing receptacle, an electrical resistor removably positioned within said receptacle said resistor serving to heat said compound and maintain it in a fluid state, and means operated to introduce articles to be impregnated into said container.

2. In an impregnating machine, in combination, an impregnating compound containing receptacle, an electrical resistor, means for insulatively holding said resistor and positioning the resistor about the sides and bottom of said receptacle said means being removably placed in said container.

3. In an impregnating machine, in combination, an impregnating compound container, and an electrical resistor for heating said compound insulatively positioned in said container in direct contact with said compound.

4. In an impregnating machine, the combination with a mounting frame, of an impregnating compound container slidably mounted on said frame, an electrical resistor removably positioned in said container, and means for raising and lowering said container and resistor.

5. In an impregnating machine, the combination with a mounting frame, of an impregnating compound container slidably mounted on said frame, an electrical resistor removably positioned in said container, means for raising and lowering said container and resistor, and automatic means for stopping the movement of said container in the raising and lowering operation when the desired maximum movement has been attained.

6. In an impregnating machine, the combination with a machine mounting frame, of an impregnating compound container slidably mounted on said frame, an electrical resistor removably positioned in said container, guiding means for guiding the article to be impregnated through said container positioned therein, and means for lowering and raising said container and resistor independently of said guiding means.

7. In an impregnating machine, the combination with a machine mounting frame, of an impregnating compound container slidably mounted on said frame, an electrical resistor removably positioned in said container, guiding means for guiding the article to be impregnated through said container positioned therein, means for lowering and raising said container independently of said guiding means, and means automatically operated to stop the raising and lowering movement of said container when the desired maximum movement in either direction has been attained.

8. In a wire impregnating machine, the combination with a machine mounting frame, of an impregnating container, an electrical resistor removably positioned in said container, wire guiding means suspended in said container, means operable to raise and lower said container and the inclosed resistor independently of said wire guiding means, a wire supply reel, means to guide said wire from said reel to said wire guiding means in said container, a wire scraping mechanism and a wire wiping mechanism through which said wire is drawn after leaving the guiding means in said container, and means operated to draw said wire from said reel through said container.

9. In a wire impregnating machine, the combination with a machine frame, of a wire impregnating container, means for heating said container, means comprising a rotating sleeve and coöperating screw for raising and lowering said container, means automatically operated to stop the movement of said container after said movement has been initiated, a wire supply reel, wire guiding means for guiding the wire from said supply reel through said container, a capstan for drawing the wire through said container over said wire guiding means, a wire distributing means, and a take-up reel to which the impregnated wire is guided by said distributing means.

10. In an impregnating machine, the combination with a mounting frame, of an impregnating compound container slidably mounted thereon, means for heating the compound contained in said container, means operated to raise and lower said container, a cover for said container containing openings through which the article to be impregnated is introduced into said container, and an exhausting means operated to collect and exhaust the fumes which escape through the openings in said cover.

11. An insulated wire covering machine embodying therein a tank, standards in connection therewith and adjacent opposite ends thereof, slides mounted to have vertical movement along said standards, sheaves rotatably mounted from said standards, means whereby said slides may be moved to cause a relative movement of said sheaves and said tank, normally inoperative actuating means coöperating with said last named means, and means whereby said actuating means may be made operative to impart movement to said slides in either direction.

In witness whereof, I hereunto subscribe my name this 21st day of December A. D., 1917.

FREDERIC S. KOCHENDORFER.